(12) United States Patent
Rowlay et al.

(10) Patent No.: US 8,312,632 B2
(45) Date of Patent: Nov. 20, 2012

(54) SAW BLADE HANDLE WITH REPLACEABLE BLADES

(75) Inventors: Stephen Rowlay, Sheffield (GB); Stewart Hawley, Sheffield (GB)

(73) Assignee: Stanley Black & Decker, Inc., New Britain, CT (US)

( * ) Notice: Subject to any disclaimer, the term of this patent is extended or adjusted under 35 U.S.C. 154(b) by 1061 days.

(21) Appl. No.: 12/186,011

(22) Filed: Aug. 5, 2008

(65) Prior Publication Data
US 2010/0031512 A1 Feb. 11, 2010

(51) Int. Cl.
*B26B 1/00* (2006.01)

(52) U.S. Cl. .................. 30/329; 30/330; 30/340; 30/342

(58) Field of Classification Search ............... 30/342, 30/337, 166.3, 331, 517, 522, 524, 339, 340, 30/329; D8/97–98
See application file for complete search history.

(56) References Cited

U.S. PATENT DOCUMENTS

| | | | |
|---|---|---|---|
| 20,313 A | 5/1858 | Smith | |
| 58,828 A * | 10/1866 | Homes | 30/524 |
| 151,363 A * | 5/1874 | Disston | 30/525 |
| 156,369 A | 10/1874 | Millspaugh | |
| 165,051 A * | 6/1875 | Andrews | 30/524 |
| 188,604 A | 3/1877 | Disston | |
| 238,758 A | 3/1881 | Brooke | |
| 601,480 A | 3/1898 | Powell | |
| 660,575 A | 10/1900 | Johnston | |
| 785,459 A | 3/1905 | Weiler | |
| 1,301,522 A | 4/1919 | Sullivan | |
| 1,362,676 A | 12/1920 | Conway | |
| 1,405,925 A | 2/1922 | Larson | |
| 2,137,800 A | 11/1938 | Davey | |
| 2,321,223 A | 6/1943 | Loughlin | 145/108 |
| 3,825,047 A * | 7/1974 | McManus et al. | 30/166.3 |
| 4,472,879 A | 9/1984 | Sizemore, Jr. | |
| 4,512,381 A | 4/1985 | Alvarez | |
| 4,841,638 A | 6/1989 | Bardeen et al. | |
| 4,870,757 A | 10/1989 | Kirkpatrick et al. | |
| 5,829,082 A | 11/1998 | Moreira | |
| 5,911,481 A | 6/1999 | Yost | |

(Continued)

FOREIGN PATENT DOCUMENTS

DE 919 663 11/1954

(Continued)

OTHER PUBLICATIONS

Partial European Search Report issued for EP Appln. No. 09150958.8, dated Mar. 31, 2009.

(Continued)

*Primary Examiner* — Boyer D Ashley
*Assistant Examiner* — Omar Flores Sanchez
(74) *Attorney, Agent, or Firm* — Pillsbury Winthrop Shaw Pittman LLP

(57) ABSTRACT

A handsaw includes a handle and a blade. The handle includes a lock assembly. The blade is releaseably mountable on the handle and includes a lock engaging region located toward one end thereof. The lock assembly includes a lock structure and a manually enagageable actuator. The lock structure is movable between a lock position in which it lockingly engages the lock engaging region to lock the blade to the handle, and a release position in which the lock structure is released from engagement with the lock engaging region to enable the blade to be released from the handle. The actuator is manually actuatable to move the lock structure from the lock position to the release position.

27 Claims, 16 Drawing Sheets

U.S. PATENT DOCUMENTS

| | | | |
|---|---|---|---|
| 5,930,902 | A | 8/1999 | Hsu |
| 6,105,260 | A | 8/2000 | Parrish et al. |
| 6,112,420 | A | 9/2000 | Schickerling |
| 6,508,003 | B1 | 1/2003 | Parrish et al. |
| 6,516,525 | B2 | 2/2003 | Liu |
| 6,546,633 | B1 | 4/2003 | Lovell et al. |
| 6,578,271 | B1 | 6/2003 | Macek |
| 6,701,626 | B2 | 3/2004 | Knoop |
| 6,715,211 | B1 | 4/2004 | Chi |
| 6,754,967 | B2 | 6/2004 | Lovell et al. |
| 6,789,326 | B1 | 9/2004 | Huang |
| 6,854,187 | B2 | 2/2005 | Huan |
| 7,065,885 | B1 | 6/2006 | Chen |
| 7,325,314 | B1 | 2/2008 | Chen |
| 2002/0029484 | A1 | 3/2002 | Takeuchi |
| 2004/0163264 | A1 | 8/2004 | Simonz |
| 2004/0168328 | A1 | 9/2004 | Thomas et al. |
| 2004/0231172 | A1 | 11/2004 | Jimenez |
| 2005/0050743 | A1 | 3/2005 | Kabasawa |
| 2005/0132584 | A1 | 6/2005 | Cornwell et al. |
| 2005/0138820 | A1 | 6/2005 | Gist et al. |
| 2006/0053639 | A1 | 3/2006 | Nakanishi |
| 2007/0044323 | A1 | 3/2007 | Chao |
| 2007/0101591 | A1 | 5/2007 | Wen |
| 2008/0092396 | A1 * | 4/2008 | Wang .......................... 30/166.3 |
| 2010/0018065 | A1 * | 1/2010 | Janssson et al. ................ 30/517 |
| 2010/0192382 | A1 * | 8/2010 | Burch et al. ................... 30/161 |
| 2010/0319201 | A1 * | 12/2010 | Scott et al. ................... 30/166.3 |

FOREIGN PATENT DOCUMENTS

| | | |
|---|---|---|
| DE | 202005008995 U1 | 9/2005 |
| EP | 1053813 A2 | 11/2000 |
| WO | 2008082348 A1 | 7/2008 |

OTHER PUBLICATIONS

European Search Report issued for EP Appln. No. 09150958.8, dated Mar. 31, 2009.

First Office Action as issued for Canadian Patent Application No. 2,651,622, dated Mar. 22, 2010.

Examination Report as issued for Australian Patent Application No. 2009200392, dated Oct. 8, 2010.

Extended Search Report as issued for European Patent Application No. 10189627.2, dated Dec. 7, 2010.

Bahco Ergo Handsaw System presentation, SNA Europe, 2008, 16 pages.

* cited by examiner

SAW BLADE HANDLE WITH REPLACEABLE BLADES

BACKGROUND OF THE INVENTION

Field of the Invention

The present invention relates a handsaw, and, more particularly to a handsaw in which a blade is releasably mounted on the handle.

A conventional handsaw includes a handle, and a blade mounted on the handle. However, the blade is attached on the handle such that the blade cannot be replaced when the blade is worn out, or exchanged with a different blade type. The present invention is in the field of a handsaw with a replaceable blade.

SUMMARY OF THE INVENTION

One aspect of the present invention provides a handsaw. The handsaw includes a handle and a blade. The handle includes a lock assembly and a stabilizing clamp assembly. The blade is releaseably mountable on the handle and includes a lock engaging region located toward one end thereof. The lock assembly includes a lock structure and a manually enagageable actuator. The lock structure is movable between a lock position in which it lockingly engages the lock engaging region of the blade to lock the blade to the handle, and a release position in which the lock structure is released from engagement with the lock engaging region to enable the blade to be released from the handle. The actuator is manually actuatable to move the lock structure from the lock position to the release position. The stabilizing clamp assembly is constructed and arranged to move between a clamp position in which the clamp assembly applies a clamping force to side surfaces of the blade and a release position in which the clamp assembly releases the clamping force.

Another aspect of the present invention provides a handsaw. The handsaw includes a handle and a blade. The handle includes a lock assembly. The blade is releaseably mountable on the handle and includes a lock engaging region located toward one end thereof. The lock assembly includes a lock structure and a manually enagageable actuator. The lock structure is linearly movable between a lock position in which it lockingly engages the lock engaging region to lock the blade to the handle, and a release position in which the lock structure is released from engagement with the lock engaging region to enable the blade to be released from the handle. The actuator is manually actuatable to move the lock structure from the lock position to the release position.

Another aspect of the present invention provides a handsaw. The handsaw includes a handle and a blade. The handle includes a lock assembly. The blade is releaseably mountable on the handle and includes a lock engaging region located toward one end thereof. The lock assembly includes a lock structure and a manually enagageable actuator. The lock structure is movable between a lock position in which it lockingly engages the lock engaging region of the blade to lock the blade to the handle, and a release position in which the lock structure is released from engagement with the lock engaging region to enable the blade to be released from the handle. The actuator is manually actuatable to move the lock structure from the lock position to the release position. The blade includes an alignment mark located on the blade. The alignment mark is constructed and arranged to provide an indication whether the handle is accurately positioned on the blade.

Another aspect of the present invention provides a handsaw. The handsaw includes a handle and a blade. The handle includes a lock assembly. The blade is releaseably mountable on the handle and includes a lock engaging region located toward one end thereof. The lock assembly includes a spring biased lock structure and a manually enagageable actuator. The lock structure being movable between a lock position wherein it lockingly engages the lock engaging region of the blade to lock the blade to the handle, and a release position wherein the lock structure is released from engagement with the lock engaging region of the blade to enable the blade to be released from the handle. The lock structure is biased towards the lock position, and wherein generally translational movement of the blade into engagement with the lock structure moves the lock structure against the spring bias until the lock structure locks with the lock engaging region of the blade. The actuator is manually actuatable to move the lock structure from the lock position to the release position.

Another aspect of the present invention provides a handsaw. The handsaw includes a handle and a blade. The handle comprises a lock assembly and having a slot and internal guide surfaces. The blade is releaseably mountable on the handle, and the blade comprises a lock engaging region located toward one end thereof. The lock assembly includes a spring biased lock structure and a manually enagageable actuator. The lock structure is movable between a lock position wherein it lockingly engages the lock engaging region of the blade to lock the blade to the handle, and a release position wherein the lock structure is released from engagement with the lock engaging region of the blade to enable the blade to be released from the handle. The actuator is manually actuatable to move the lock structure from the lock position to the release position. The guide surfaces guide the lock engaging region of the blade into locking engagement with the lock structure when the blade is moved translationally into the slot.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
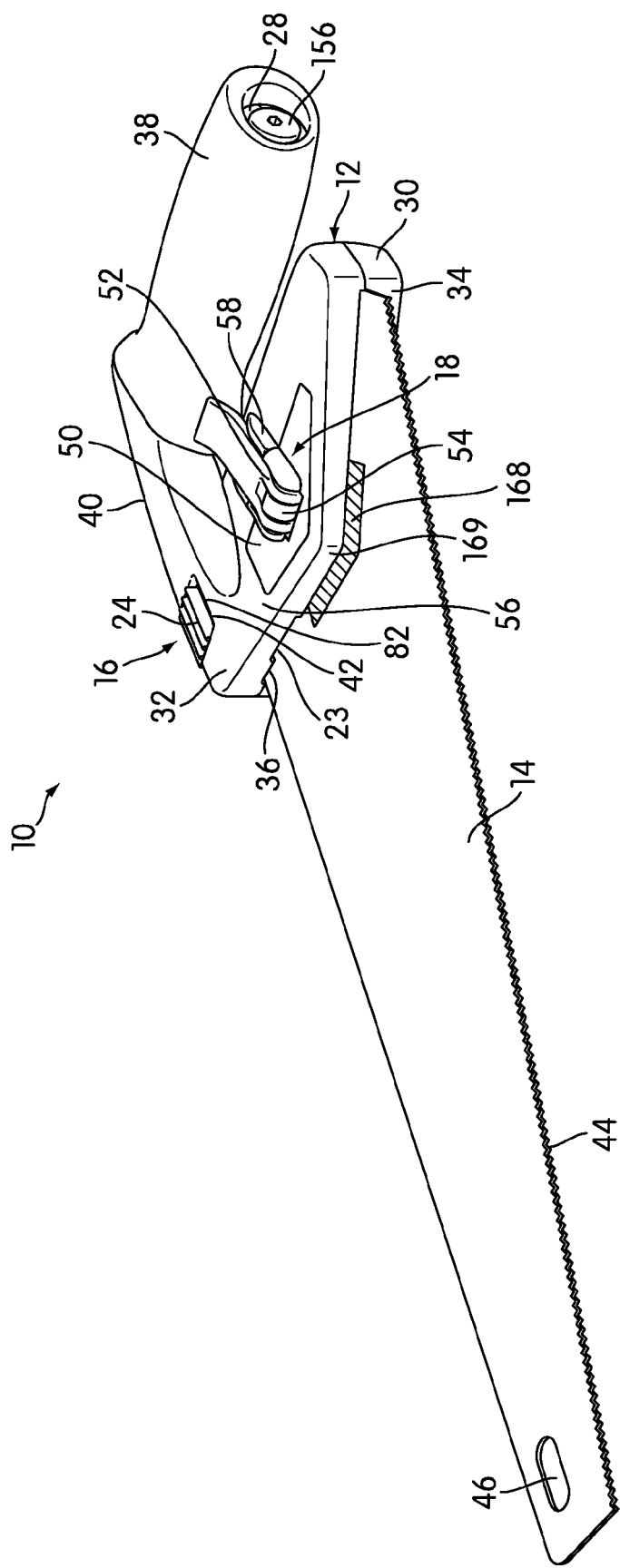
FIG. 1 is a perspective view of a handsaw in accordance with an embodiment of the present invention.
Figure 2:
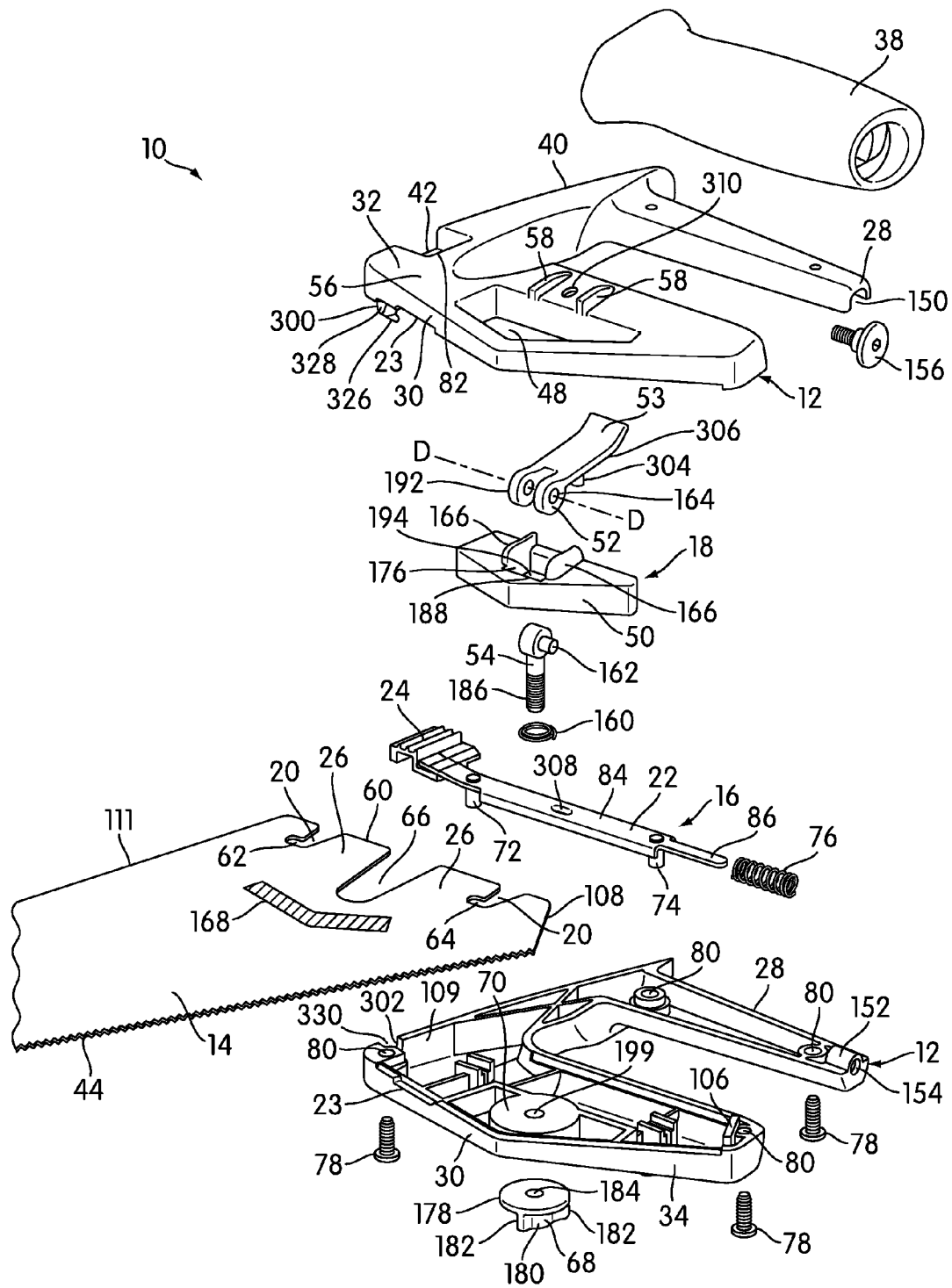
FIG. 2 is an exploded perspective view of the handsaw in accordance with an embodiment of the present invention.

FIGS. 1 and 2 show a handsaw 10 in accordance with an embodiment of the present invention. The handsaw 10 includes a handle 12 and a blade 14. The handle 12 includes a lock assembly 16 and a stabilizing clamp assembly 18. The blade 14 is releaseably mountable on the handle 12 and includes a lock engaging region 20 located toward one end 60 thereof. The lock assembly 16 includes a lock structure 22 and a manually enageable actuator 24. The lock structure 22 is movable between a lock position in which the lock structure 22 lockingly engages the lock engaging region 20 of the blade 14 to lock the blade 14 to the handle 12, and a release position in which the lock structure 22 is released from engagement with the lock engaging region 20 to enable the blade 14 to be released from the handle 12. The actuator 24 is manually actuatable to move the lock structure 22 from the lock position to the release position. The stabilizing clamp assembly 18 is constructed and arranged to move between a clamp position in which the clamp assembly 18 applies a clamping force to side surfaces 26 of the blade 14 and a release position in which the clamp assembly 18 releases the clamping force.

The handle 12 includes a first portion 32 and a second portion 34 joined to each other to define a slot 36 therebetween. The slot 36 is constructed and arranged to receive the blade 14 therein.

In one embodiment, as shown in FIG. 2, the first portion 32 provides a first cooperating interlocking structure 300 and the second portion 34 provides a second cooperating interlocking structure 302. The first and second cooperating interlocking structures 300, 302 are configured to interlock with one another to prevent relative pivotal movement between the first and second portions 32, 34 of the handle 12 with respect to one another. In one embodiment, the first and second cooperating interlocking structures 300, 302 are located near top surface portions of the first and second portions 32, 34 of the handle 12 respectively. In one embodiment, the first interlocking structure 300 comprises a hook-shaped portion 326 that protrudes from a connector portion 328 of the first interlocking structure 300. In one embodiment, the second interlocking structure 302 comprises a recess or pin 330 that is constructed and arranged to receive or engage with the hook-shaped portion 326 of the first interlocking structure 300. In another embodiment, both the interlocking structures 300, 302 comprise hook-like structures. In one embodiment, the first and second portions 32, 34 of the handle 12 are pivoted such that the hook-shaped portion 326 of the first interlocking structure 300 engages with the recess 330 in the second interlocking structure 302 and, thus, interlocking the first and second portions 32, 34 of the handle 12.

In one embodiment, the first and second portions 32, 34 of the handle 12 are attached to each other first by interlocking the first and second cooperating interlocking structures 300, 302 with each other, and then securing the first portion 32 and the second portion 34 of the handle 12 to each other by any attachment mechanism or fastener as would be appreciated to one skilled in the art. In one embodiment, the attachment mechanism includes, but not limited to, fastening, bolting, riveting, or adhesive bonding. In the illustrated embodiment, a plurality of screws 78 are configured to pass through screw holes 80 formed in the first portion 32 and the second portion 34 of the handle 12 to secure the first portion 32 with the second portion 34. The screw holes 80 formed in the first portion 32 are constructed and arranged to align with the screw holes 80 that are formed in the second portion 34. In one embodiment, the first portion 32 and the second portion 34 of the handle 12 may include screw posts that include the screw holes 80.

A recess 42 is formed on the first portion 32 of the handle 12. The recess 42 is constructed and arranged to receive and support the manually engageable actuator 24 of the lock assembly 16. In one embodiment, the recess 42 extends downwardly from a top surface portion 40 of the first portion 32 to a side surface portion 56 of the first portion 32. In one embodiment, a surface 82 of the recess 42 acts as a stop preventing the extent by which the manually engageable actuator 24 may move, when the lock structure 22 is moved from the lock position to the release position.

The first portion 32 of the handle 12 also includes a notch or opening 48 therein. The notch 48 is constructed and arranged to receive a blade engaging portion 50 of the stabilizing clamp assembly 18, an eccentric cam 52 and a connecting member 54 therein. The first portion 32 of the handle 12 includes a pair of ribs 58 located on the side surface portion 56. The pair of ribs 58 are constructed and arranged to receive a portion (e.g., a manually engageable portion or lever) of the eccentric cam 52 therebetween, when the clamp assembly 18 is in the clamp position.

In one embodiment, each of first portion 32 and the second portion 34 of the handle 12 includes a grip supporting portion 28 and a blade attachment portion 30. In one embodiment, as shown in FIG. 2, the grip supporting portion 28 of the first portion 32 includes a groove 150 located at one end thereof that is constructed and arranged to engage with a raised portion 152 located on the grip supporting portion 28 of the second portion 34. In one embodiment, the raised portion 152 includes a screw receiving opening 154. Once the groove 150 of the first portion 32 is engaged with the raised portion 152 of the second portion 34, a screw 156 is passed through the screw receiving opening 154 to secure the grip supporting portions 28 of the first and second portions 32 and 34 respectively. In one embodiment, aligning the screw holes 80 in the first portion 32 with the screw holes 80 in the second portion 34 also aligns the groove 150 of the first portion 32 with the raised portion 152 of the second portion 34 or vice versa. In such embodiment, the screws 78 are passed through the screw holes 80, and the screw 156 is passed through the screw receiving opening 154 to secure the first and second portions 32 and 34 to each other respectively. In one embodiment, the enlarged head portion of screw 156 prevents the hand grip 38 (as will be described) from sliding off of the support 28. In the illustrated embodiment, two screw holes 80 are located on the grip supporting portion 28 and two screw holes 80 are located on the blade attachment portion 30. It is contemplated that, however, the number of screw holes 80 that are located on the grip supporting portion 28 and the blade attachment portion 30 can vary.

The second portion 34 of the handle 12 includes a notch or recess 70. In one embodiment, the notch 70 is constructed and arranged to receive a securing member 68 of the clamp assembly 18. In the illustrated embodiment, the notch 70 is cylindrical in shape. It should be appreciated, however, that different shapes, configurations, and/or constructions of notches may be provided as long as it receives the securing member 68 of the clamp assembly 18.

The handle 12 facilitates a user a secure grip by hand grip 38. The hand grip 38 is attached directly onto the handle 12 and securely conforms to the grip supporting portions 28 of the first and second portions 32 and 34. In one embodiment, the grip 38 is in a thick, soft foam rubber. In another embodiment, the grip 38 is formed from a relatively rigid elastomeric, rubber based, or plastic material. In one embodiment, the hand grip 38 is secured to the grip supporting portions 28 of the first and second portions 32 and 34 using adhesive bonding, riveting, or any other attachment mechanism as would be appreciated by one skilled in the art. In one embodiment, the hand grip 38 is secured to the grip supporting portions 28 of the first and second portions 32 and 34 after securing the first and second portions 32 and 34 with each other. In one embodiment, the hand grip 38 can be slid off of the support 28, after the fastener 156 is removed, to provide the user the ability to change the hand grip 38 with a new or a different grip 38.

Figure 3:
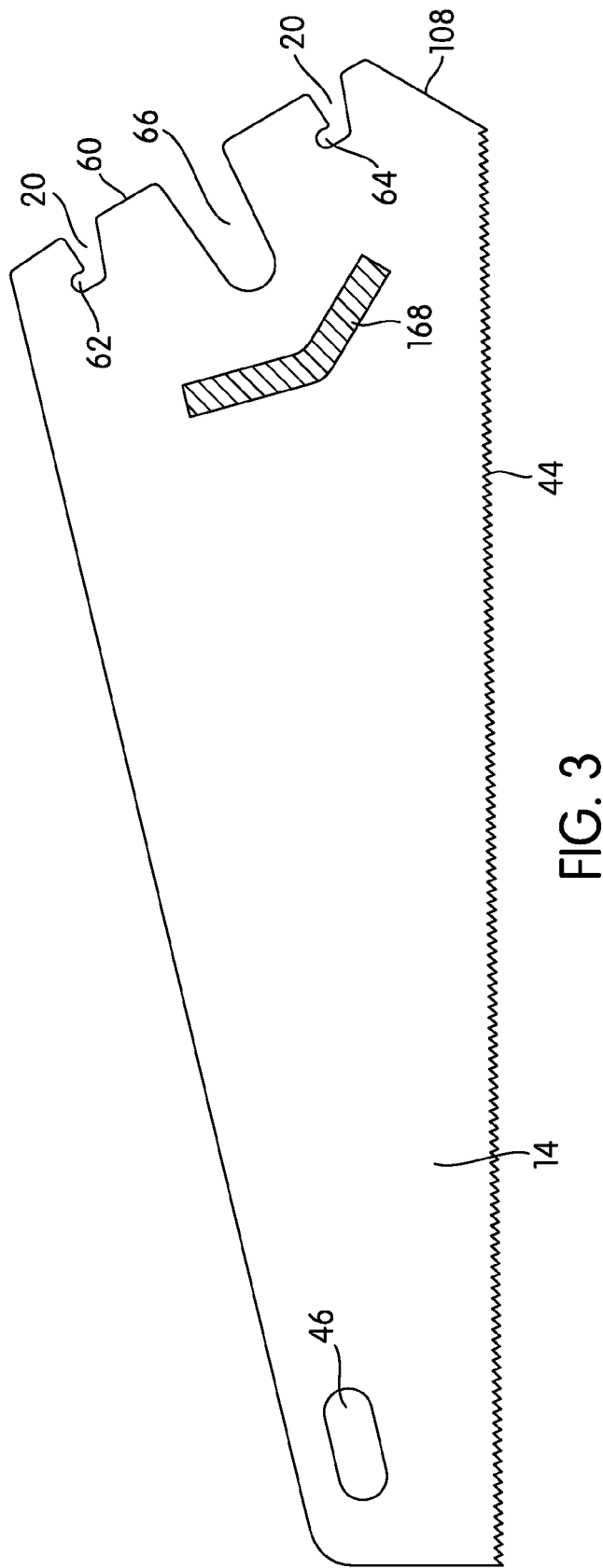
FIG. 3 is a side view of a saw blade in accordance with an embodiment of the present invention.

As shown in FIGS. 2 and 3, the blade 14 is in the form of a flat structure and includes a cutting edge 44. In one embodiment, the cutting edge 44 includes a plurality of cutting teeth for use in cutting through work pieces. In one embodiment, the handsaw 10 may include a blade guard (not shown) that is constructed and arranged to restrict inadvertent contact with the cutting edge 44. In one embodiment, the blade 14 includes an elongated opening 46. In one embodiment, the elongated opening 46 is located closer to an end of the blade 14 that is opposite to the end 60, which is mountable on the handle 12. In one embodiment, the elongated opening 46 is used to hang the blade 14, for example, on a nail or a screw, for storage when the blade 14 is not in use.

In one embodiment, an alignment mark 168 is located on the blade 14. The alignment mark 168 is constructed and arranged to provide an indication whether the handle 12 is accurately positioned on the blade 14. In one embodiment, when the handle 12 is correctly positioned on the blade 14, the alignment mark 168 is aligned (conforms with) the shape of a forward portion 169 of the handle 12 to provide an indication to the user that the handle 12 has been correctly oriented on the blade 14. In one embodiment, the alignment indicator may be in the form of a mechanical indicator that shows a flag or a marker when the blade 14 to the handle 12 orientation is correct.

The lock engaging region 20 of the blade 14 includes a pair of recesses 62 and 64. In the illustrated embodiment, the pair of recesses 62 and 64 are in the form of a L-shaped recesses. It is contemplated that the recesses may have any shape, configuration, and/or construction as long as the recesses lockingly engage with a lock structure provided on the handle 12. In the illustrated embodiment, the lock structure 22 comprises a pair of pins 72 and 74 to lock the blade 14 to the handle 12. The blade 14 also includes an opening 66 that is located between the recesses 62 and 64. The opening 66 is constructed and arranged to allow the connecting member 54 of the clamp assembly 18 to pass therethrough and engage with the securing member 68 of the clamp assembly 18 that rests on or engages with the second portion 34.

Figure 3A:
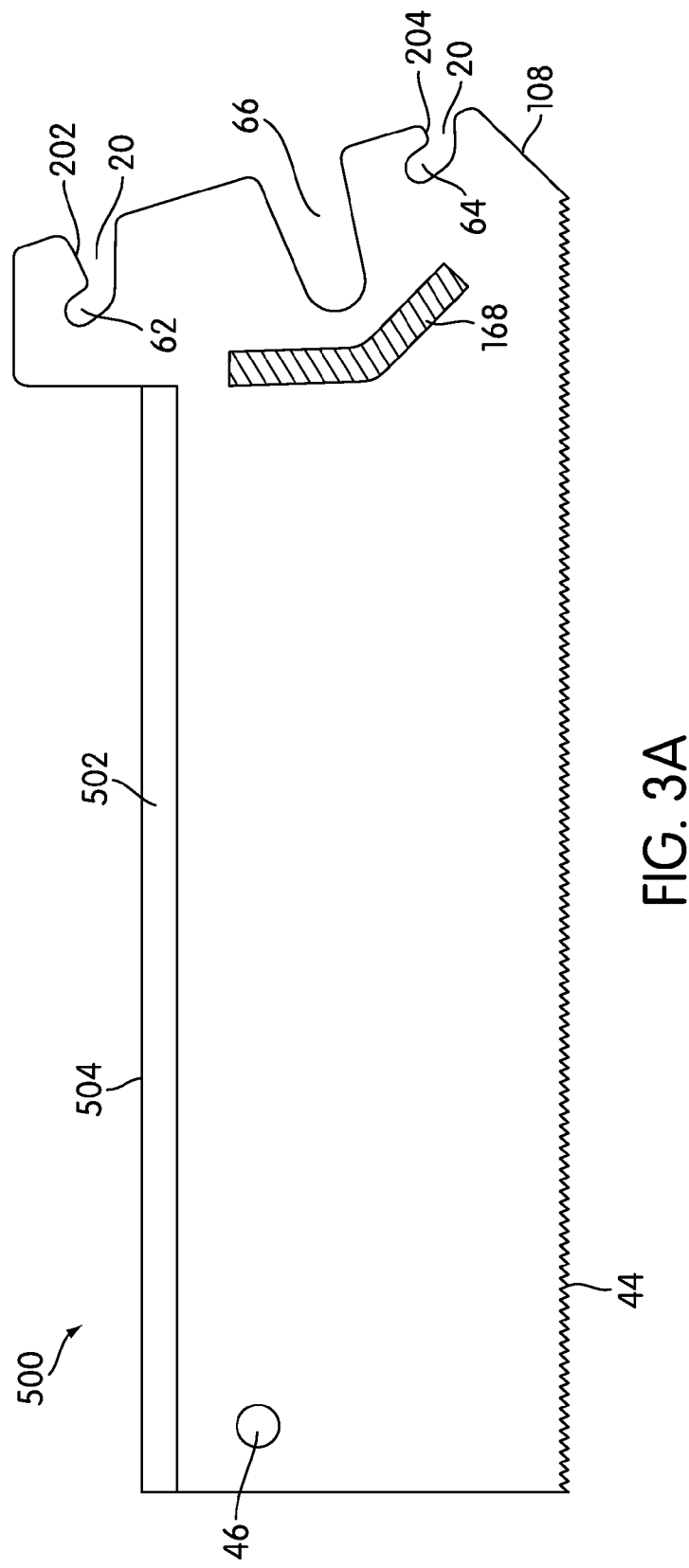
FIG. 3A is a side view of a backsaw blade in accordance with an embodiment of the present invention.

In one embodiment, a backsaw blade 500, as shown in FIG. 3A, may be used with the handle 12. As shown in FIG. 3A, the backsaw blade 500 includes a stiffening rib 502 on an upper edge 504 that is opposite the cutting edge 44, allowing for more precise cutting. In one embodiment, the stiffening rib 502 is thicker than the blade 14.

As shown in FIGS. 1 and 2, the first and the second portions 32 and 34 of the handle 12, when joined to each other, provide an enlarged opening 23 therebetween. The enlarged opening 23 forms part of slot 36 and is constructed and arranged to receive the stiffening rib 502 of the backsaw blade 500 therewithin. This arrangement allows the same saw handle to be used with different blade types.

Referring back to FIG. 2, the lock structure 22 includes a spring 76, a first section 84 and the second section 86. The first section 84 includes the pair of pins 72 and 74 that are constructed and arranged to project outwardly from the first section 84. As noted above, the pins 72 and 74 are constructed and arranged to engage with the recesses 62 and 64 on the blade 14 to lock the blade 14 to the handle 12. It is appreciated, however, that the pins are but one example of different shapes, configurations and/or constructions of the lock structures that can be provided. The second section 86 is constructed and arranged to support the spring 76. The spring 76 is constructed and arranged to bias the lock structure 22 toward the lock position.

In one embodiment, the lock structure 22 is linearly movable between the lock position and the release position. In one embodiment, the lock assembly 16 is constructed and arranged to move linearly to disengage the pins 72 and 74 from the recesses 62 and 64 to release the blade 14 from the handle 12.

The clamp assembly 18 includes the eccentric cam 52, the connecting member 54, the blade engaging portion 50, a spring 160 (e.g., a washer spring) and the securing member 68. In illustrated embodiment, the spring 160 is conical in shape, for example, having a wider base. In one embodiment, the eccentric cam 52 is rotatable about a pivot axis D-D. In general, the eccentric cam 52 has an eccentric portion that surrounds the pivot axis D-D. In one embodiment, the eccentric cam 52 is rotated using a clamp member or lever portion 53 that is attached to one end of the eccentric cam 52. The eccentric cam 52 includes a camming surface 192 (see FIG. 10) that is constructed and arranged to engage with a surface 194 of a recess 176 located in the blade engaging portion 50, when the clamp assembly 18 is in the clamp position.

Figure 13:
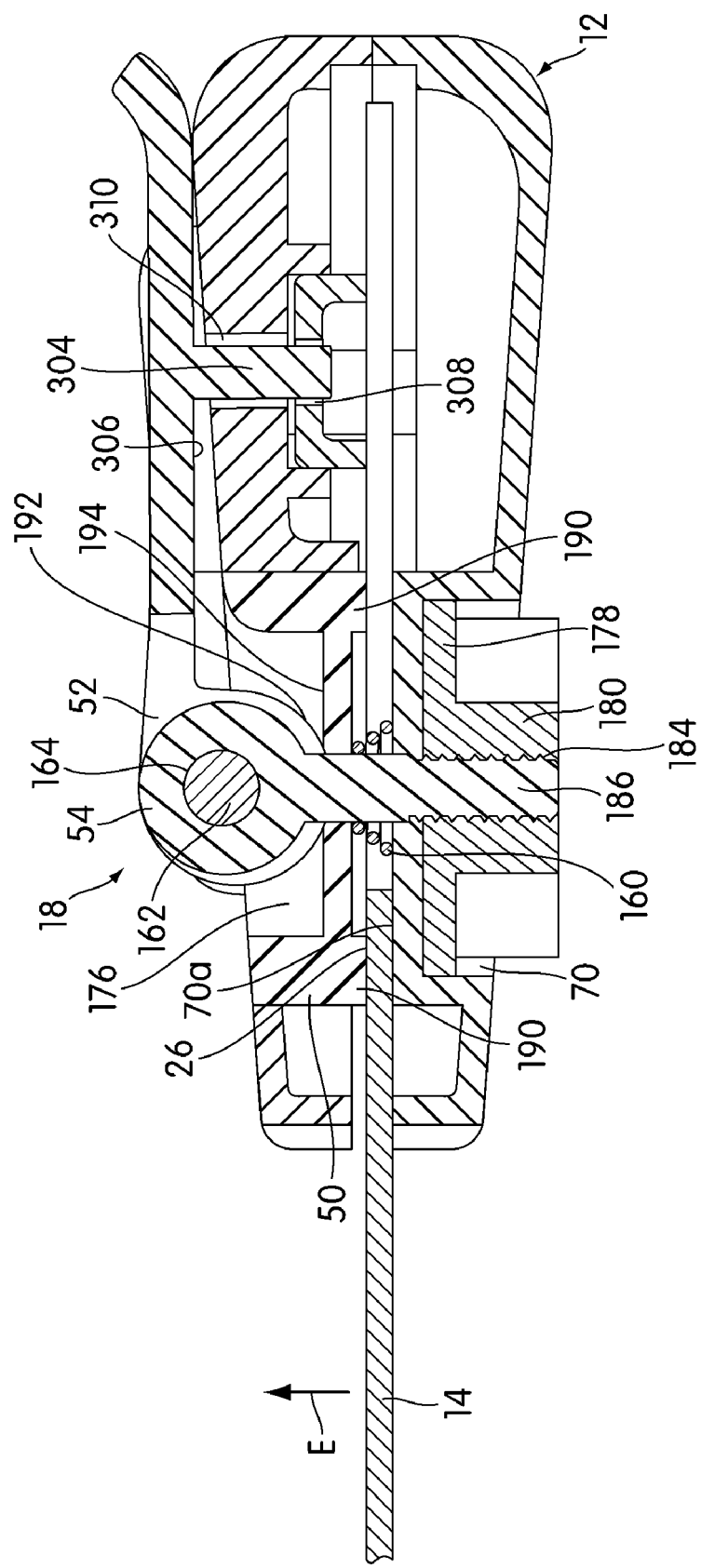
FIG. 13 is a cross-section view of the clamp assembly when placed in the clamp position in accordance with an embodiment of the present invention.

In one embodiment, as shown in FIG. 2, the clamp member or lever portion 53 includes a projection 304 that is located on a lower surface 306 of the clamp member or lever portion 53. The projection 304 on the clamp member or lever portion 53 is constructed and arranged to engage with an opening 308 on the first section 84 of the lock structure 22, when the clamp assembly 18 is in the clamp position. In one embodiment, the first portion 32 of the handle 12 includes an opening 310 that is constructed and arranged to allow the projection 304 on the clamp member or lever portion 53 to pass therethrough to engage with the opening 308 on the first section 84 of the lock structure 22. The projection 304 on the clamp member or lever portion 53, when engaged with the opening 308 on the first section 84 of the lock structure 22, acts as an interlock to prevent any movement of the lock assembly 16 when the clamp assembly 18 is clamped (via the lever portion 53 being pivoted to the clamped position wherein it is against the side of the handle as shown in FIG. 13). In one embodiment, when the projection 304 on the clamp member or lever portion 53 is engaged with the opening 308 on the first section 84 of the lock structure 22, then the manually engageable actuator 24 cannot be actuated to move the lock structure 22 from the lock position to the release position.

In one embodiment, the connecting member 54 includes a pin 162 (see FIGS. 2 and 10) projecting from one side thereof that are constructed and arranged to engage with an opening 164 formed in the eccentric cam 52. In one embodiment, the connecting member 54 includes an externally threaded portion 186. The connecting member 54 is constructed and arranged to pass through the opening 66 in the blade 14 and an opening 199 in the second portion 34 to engage with the securing member 68 that rests on or engages with the outer surface of the second portion 34.

In one embodiment, the securing member 68 includes a top surface portion 178, a post 180, and a plurality of the ribs 182. When the securing member 68 is received in the notch 70 on the second portion 34, the top surface portion 178 engages with a surface of the notch 70 on the second portion 34. The post 180 and the top surface portion 178 include an opening 184 located centrally therethrough. The opening 184 is constructed and arranged to receive the externally threaded portion 186 of the connecting member 54 therethrough. In one embodiment, the opening 184 is an internally threaded opening. In one embodiment, the externally threaded portion 186 of the connecting member is constructed and arranged to engage with the internally threaded opening 184 to connect the connecting member 54 with the securing member 68. The plurality of ribs 182 extend downwardly from the top surface portion 178 and are located at circumferentially spaced locations around the post 180.

The blade engaging portion 50 includes a pair of ribs 166 that are constructed and arranged to receive the portion (e.g., the lever portion) of the eccentric cam 52 therein, when the clamp assembly 18 is in the clamped position. In one embodiment, the pair of ribs 166 on the portion 50 are aligned with the pair of the ribs 58 on the first portion 32 of the handle 12 to receive the portion (e.g., a clamping member or lever) of the eccentric cam 52, when the clamp assembly 18 is in the clamped position. In one embodiment, the portion 50 includes the notch 176 to receive the eccentric cam 52 and the connecting member 54 therewithin. A top surface portion 188 of portion 50 of the clamp assembly 18 acts as a stop for preventing the rotation of the eccentric cam 52 beyond a certain length of travel.

Figure 10:
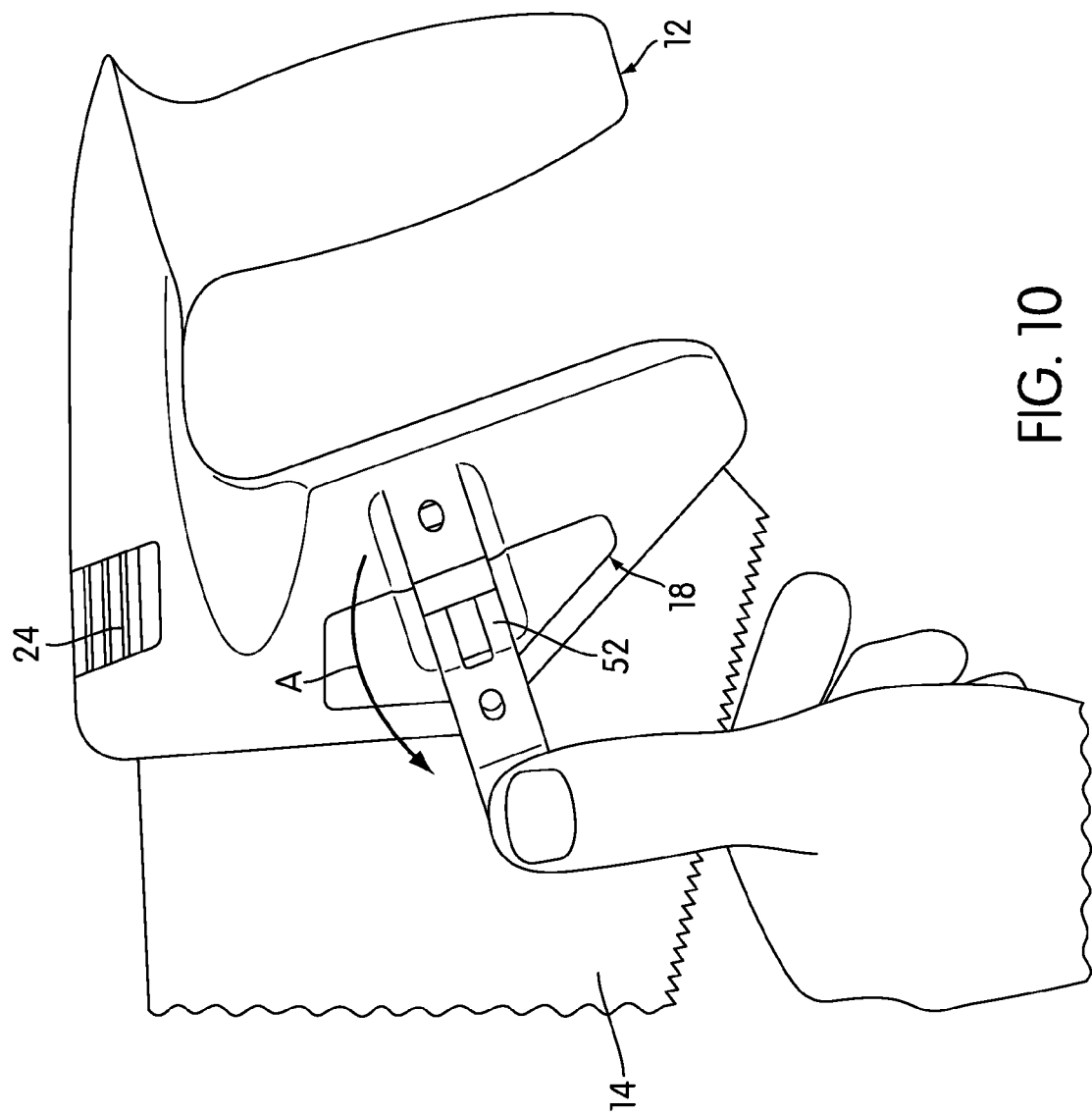
FIG. 10 is a partial side view of the handsaw, in which the clamp assembly is moved from the clamp position to a release position in accordance with an embodiment of the present invention.

As shown in FIG. 10, when the clamp assembly 18 is in the clamped configuration, the eccentric cam surface 192 is forced against surface 194 of the blade engaging portion 50, which in turn is forced toward the blade 14. This action stresses spring 160, which provides some range of biased movement of the blade engaging portion 50 relative to the securing member 68. In one embodiment, the spring 160 can directly engage the saw blade 14 to provide a direct clamping engagement force. In another embodiment, the spring 160 can be eliminated, and the tolerances of the remaining parts can be configured to apply the clamping force through blade engaging portion 50 without the spring.

In the illustrated embodiment, the amount of clamping force applied by the clamp assembly 18 can be adjusted by rotating the securing member 68 in a tightening or loosening direction, depending on whether more or less clamping force is desired, and/or to adjust for various thickness saw blades. The clamping force applied by the clamp assembly reduces or entirely eliminates slight relative movement (e.g., side to side, up and down, and/or back and forth) that might otherwise exist in the absence of the clamp assembly 18.

When in the clamp position, the blade engaging portion 50 of the clamp assembly 18 engages one side 26 of the blade 14, while the opposite side of the blade 14 is oppposingly engaged (clamped) by inside surface(s) of the second portion 34, such as facing surface 70a of notch 70.

Figure 4:
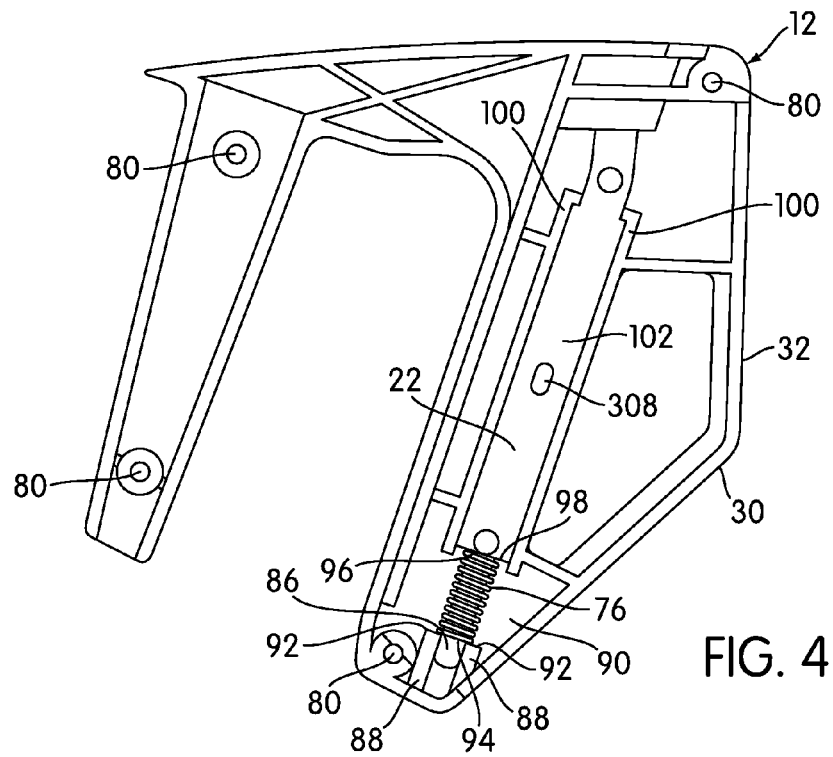
FIG. 4 is a plan view of a first portion of the handle (with a second portion and a clamp assembly removed for illustrative clarity) in accordance with an embodiment of the present invention.

FIG. 4 shows a side plan view of the first portion 32 of the handle 12 with the second portion 34 and the clamp assembly 18 removed for illustrative clarity. The blade attachment portion 30 of the first portion 32 includes a pair of ribs 88 that are located on an inner surface 90 thereof. The pair of ribs 88 are constructed and arranged to receive the second section 86 of lock structure 22 therebetween. Each rib 88 is provided with a top surface portion 92 on which one end 94 of the spring 76 rests. When the manually engageable actuator 24 is actuated to move the lock structure 22 from the lock position to the release position, the spring 76 is compressed against the top surface portions 92 of the ribs 88. The other end 96 of the spring 76 rests against a bottom surface portion 98 of the first section 86 of the lock structure 22. The blade attachment portion 30 of the first portion 32 also includes a second pair of ribs 100 that are located on the inner surface 90 thereof. The pair of ribs 100 are constructed and arranged to receive a portion 102 of the first section 84 of lock structure 22 therebetween. These ribs 100 facilitate the linear movement of the lock structure 22 between the lock and release positions.

Figure 5:
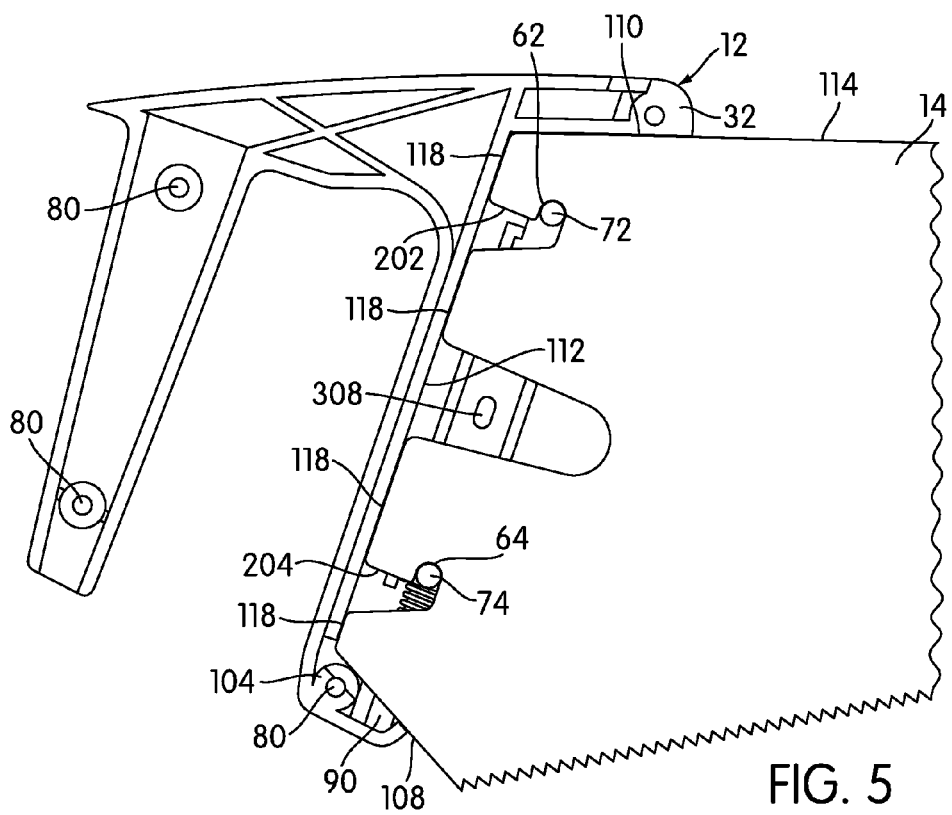
FIG. 5 is a plan view of the first portion of the handle (with the second portion and the clamp assembly removed for illustrative clarity) with the blade mounted on the handle in accordance with an embodiment of the present invention.

FIG. 5 shows a side view of the first portion 32 of the handle 12, with the second portion 34 and the clamp assembly 18 removed for illustrative clarity, with the blade 14 mounted on the handle 12. As shown in FIG. 5, the pins 72 and 74 are engaged with the recesses 62 and 64 on the blade 14 to lock the blade 14 to the handle 12.

In one embodiment, one of the screw holes 80 is in the form of a supporting post 104. The supporting post 104 is located on the inner surface 90 of the blade attachment portion 30 of the first portion 32. In one embodiment, a supporting rib 106 (as shown in FIG. 2) is constructed and arranged to engage with a lower edge or surface portion 108 of the blade 14 and to support the blade 14, when the blade 14 is locked on the handle 12. In one embodiment, as shown in FIG. 2, the supporting rib 106 is in the form of a projecting rib that is located in the vicinity of the boss or screw hole 80. The rib 106 supports the adjacent/abutting edge portion 108 of the blade 14. In addition, the rib 106 also guides the edge portion 108 when the blade 14 is inserted into the slot 36. The edge portion 108 is formed at an angle (e.g., 45 .degree.) with respect to the cutting edge 44 to facilitate the guiding function. In addition, the handle 12 includes an upper guide rib 109 to guide upper portions 111 of the blade 14 during the insertion into the slot 16. In one embodiment, the first portion 32 of the handle 12 includes supporting ribs 110 and 112 located on the inner surface 90 of the first portion 32. The supporting ribs 110 and 112 are constructed and arranged to support to surfaces 114 and 118 of the blade 14, when the blade 14 is locked on the handle 12.

Figure 6:
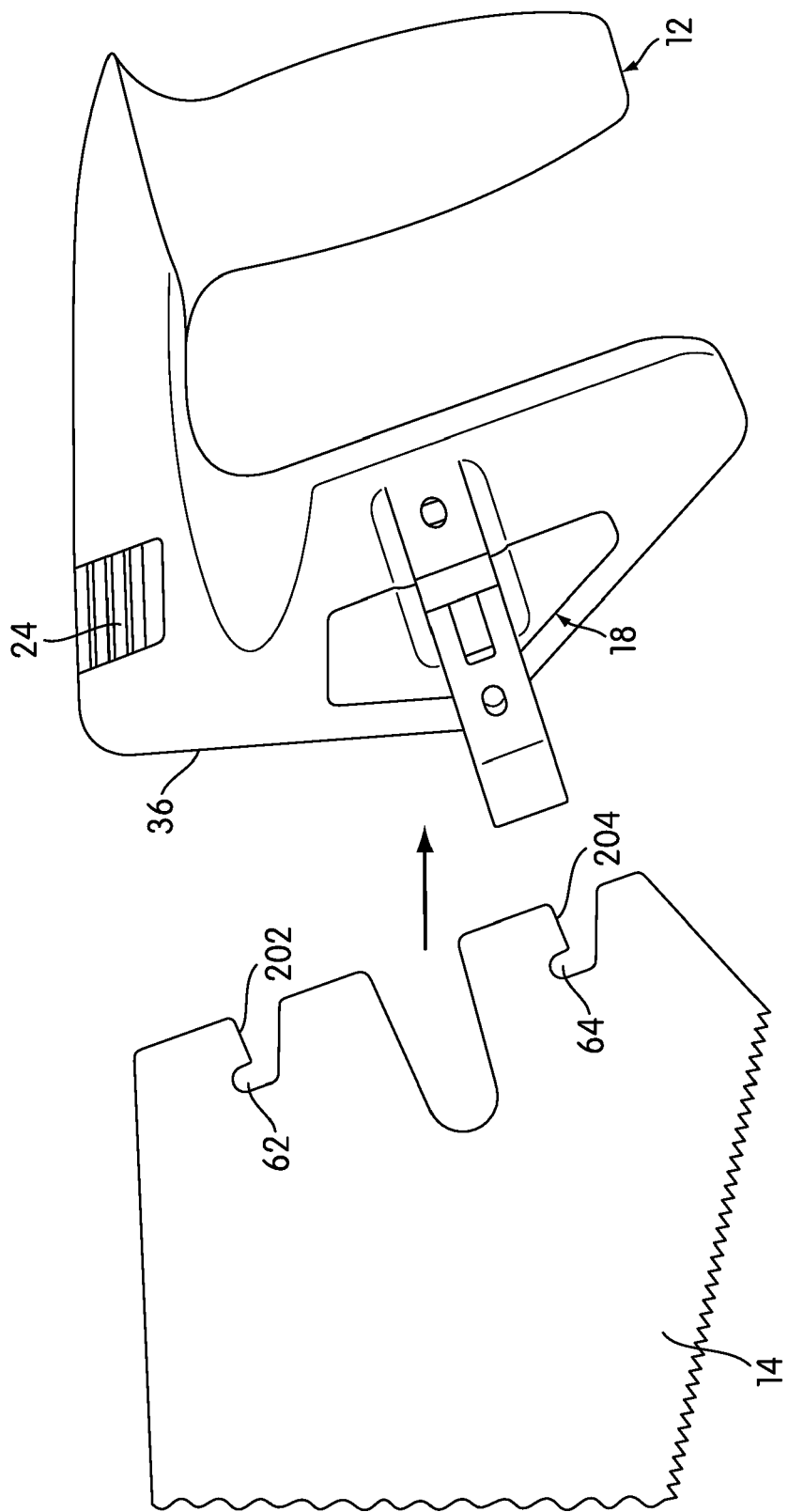
FIG. 6 is a partial side view of the handsaw, wherein the blade is moved directly towards the slot on the handle in accordance with an embodiment of the present invention.
Figure 9:
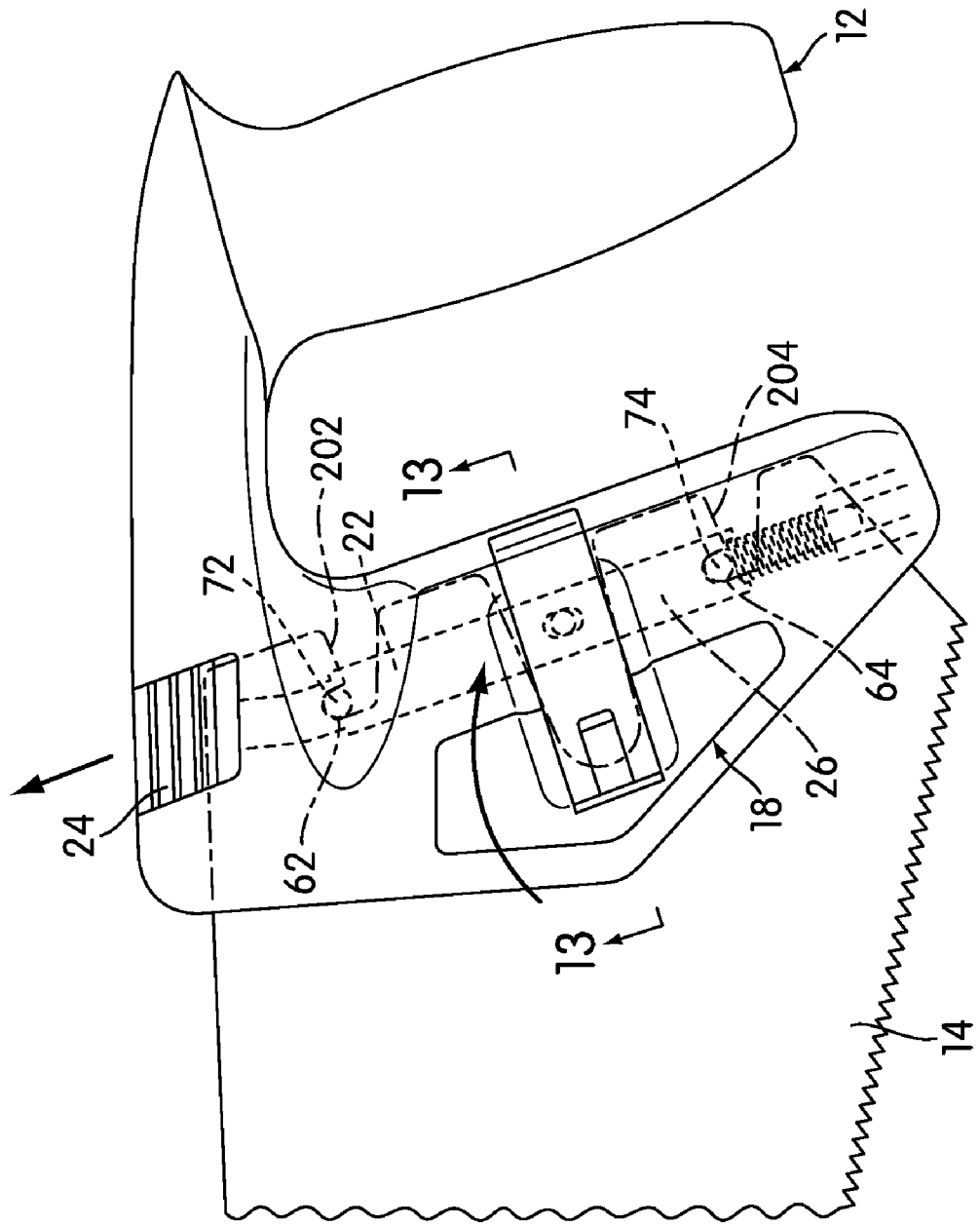
FIG. 9 is a partial side view of the handsaw with the blade mounted on the handle and the clamp assembly placed in a clamp position in accordance with an embodiment of the present invention.

FIGS. 6 and 9 show the blade 14 being engaged (e.g., automatically) by manually forcing the blade 14 into the slot 36 on the handle 12. In such embodiment, the user does not have to actuate the manually enagageable actuator 24 to engage the lock assembly 22.

Figure 7:
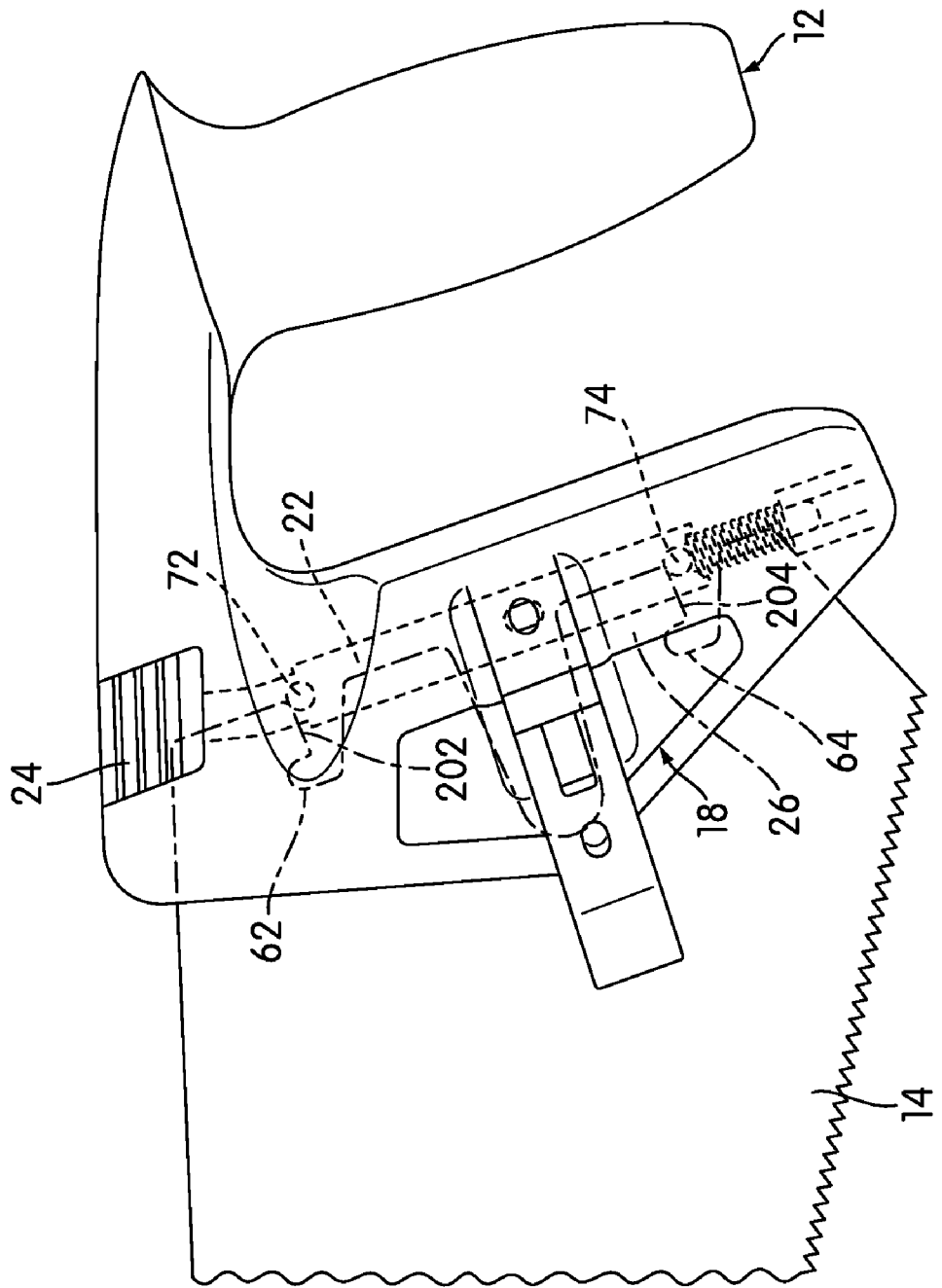
FIG. 7 is a partial side view of the handsaw, wherein when the blade is manually forced into the slot on the handle, pins engage with cam surfaces of the blade in accordance with an embodiment of the present invention.
Figure 8:
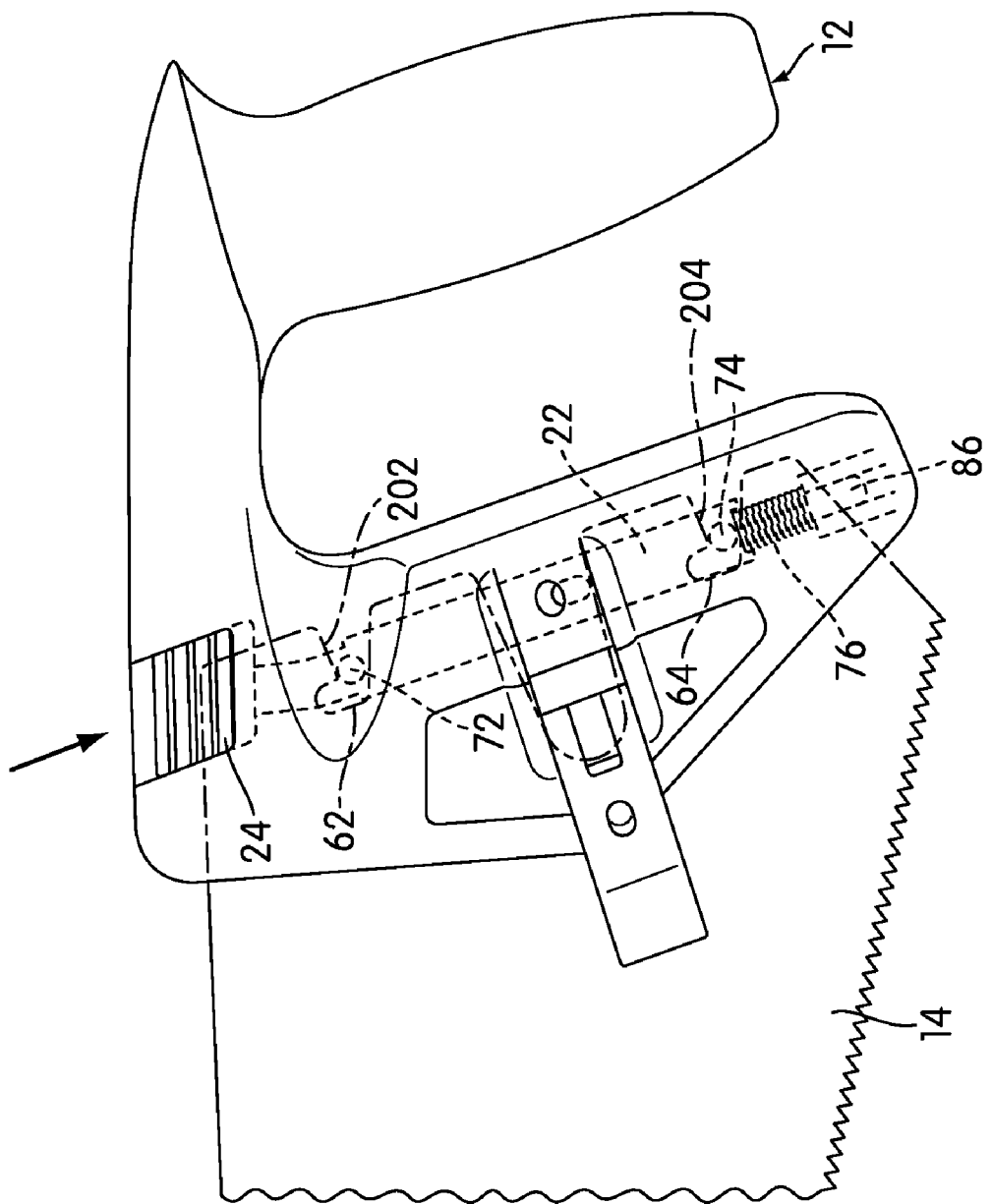
FIG. 8 is a partial side view of the handsaw, wherein camming action of the cam surfaces forces the pins downwardly, against the bias of the spring in accordance with an embodiment of the present invention.

The operation of blade 14 being connected to the handle 12 is explained with reference to FIGS. 6 and 9. The user generally brings the blade 14 directly towards the slot 36 on the handle 12. Specifically, as shown in FIG. 6, the notches 62, 64 on the blades intended to be used with handle 12 are provided with angled upper cam surface 202 and angled lower cam surface 204, respectively. As shown in FIG. 7, when the connecting end of the blade is manually forced into the slot 36 in the handle 12, the pins 72 and 74 engage the upper cam surface 202 and the lower cam surface 204, respectively. The upper cam surface 202 and the lower cam surface 204 are aligned with the pins 72 and 74 respectively, by the guide ribs 106 and 109 when the connecting end of the blade 14 is moved into the slot 36. The caroming action of the upper cam surface 202 and the lower cam surface 204 (as shown in FIG. 8) forces the pins 72 and 74 downwardly, against the bias of the spring 76. As the lock structure 22 is linearly moved downwards, the spring 76 of the lock structure 22 is compressed. As shown in FIG. 9, once the pins 72 and 74 of the lock structure 22 pass over the upper cam surface 202 and the lower cam surface 204, they snap into locking engagement with the recesses 62 and 64 respectively. The spring 76 moves the lock structure 22 upwards to the lock position to lock the blade 14 to the handle 12. Therefore, a generally linear translational movement of the blade 14 into engagement with the lock structure 22 moves the lock structure 22 against the spring 76 bias until the lock structure 22 locks with the lock engaging region 20 of the blade 14.

In one embodiment, the user generally brings the blade 14 directly towards the slot 36 on the handle 12, without need for relative pivotal movement after the pair of recesses 62 and 64 on the blade 14 engage with the pair of pins 72 and 74 on the lock structure 22. Thus, it can be appreciated that this linear translational movement is linear only in a general sense and is intended to distinguish from a pivotal type movement. In addition, it should be appreciated that the guide ribs 106, 109 can provide non-linear or linear guided movement of the blade into the locking engagement with the lock assembly 18. Thus, the ribs 106, 109 provide blade guide surfaces.

In one embodiment, an audible "CLICK" sound is produced, when the lock structure 22 is snapped into the lock position. This sound is produced when pins 72 and 74 engage the edges of recesses 62 and 64 under the force of spring 76. The "CLICK" sound signifies to the user that the lock structure 22 is in the lock position and in a safe condition.

FIG. 9 shows a side view of the handsaw 10 with the blade 14 mounted on the handle 12 and the clamp assembly 18 placed in the clamp position. The lock structure 22 is shown in the lock position in which the pins 72 and 74 on the lock structure 22 engage with the pair of recesses 62 and 64 on the blade 14 to lock the blade 14 to the handle 12. As noted above, the clamp assembly 18 is shown in the clamp position in which the clamping force is applied to the side surface 26 of blade 14.

In one embodiment, when a sufficient clamping force is applied by the clamp assembly 18, the clamp assembly 18 prevents the blade 14 from being released from the handle 12. In other words, when the clamp assembly 18 is in the clamp position, the blade 14 cannot be released from the handle 12 by simply actuating the manually engageable actuator 24, to move the lock structure 22 to the release position, because the clamping force applied by the clamp assembly 18 on the side surface 26 (as shown in FIG. 2) of the blade 14 prevents the blade 14 from being released from the handle 12. The blade 14 is released from the handle 12 first by moving the clamp assembly 18 into the release position and then by actuating the manually engageable actuator 24 to move the lock structure 22 to the release position.

Figure 11:
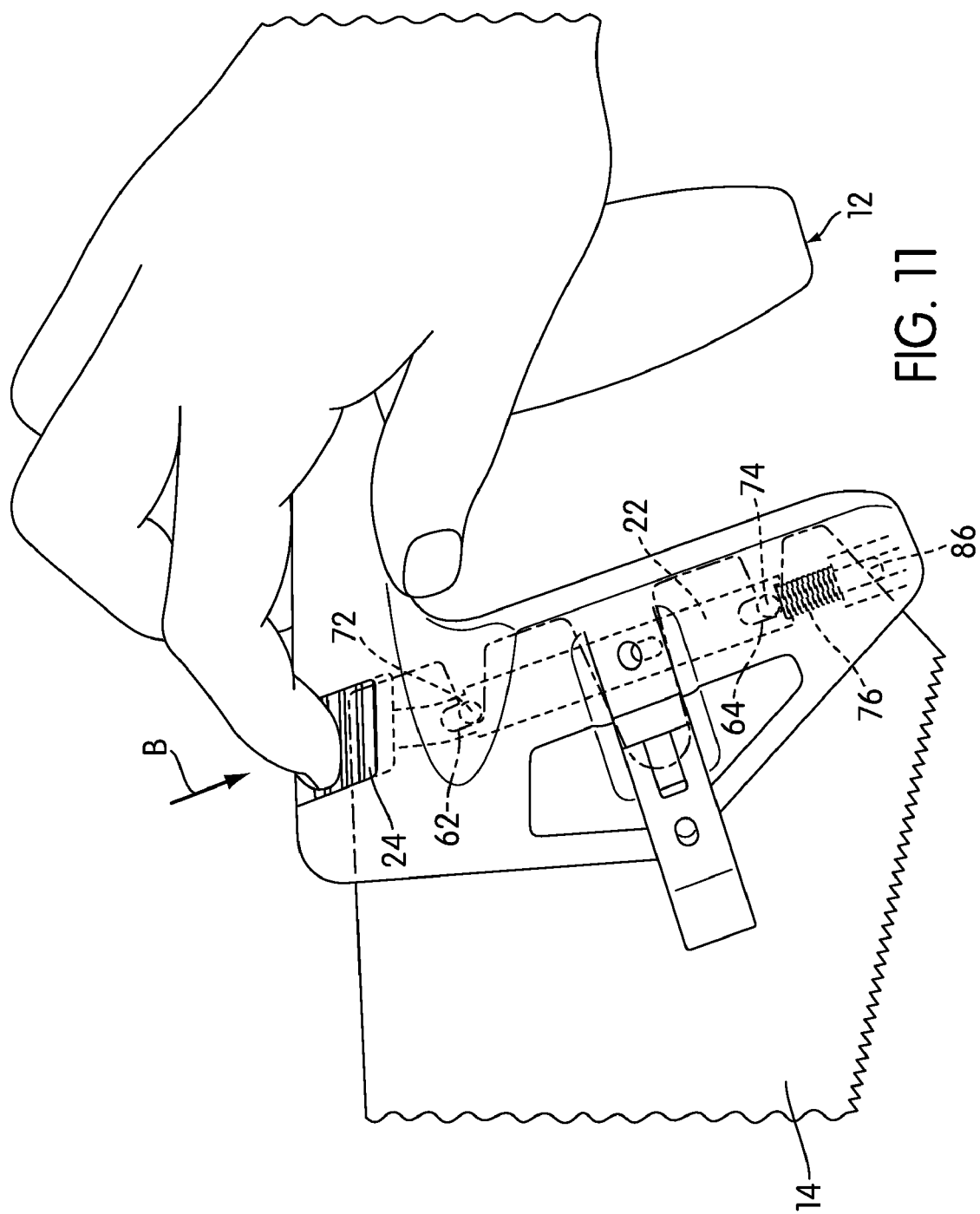
FIG. 11 is a partial side view of the handsaw, in which a manually engageable actuator is actuated to move a lock structure from a lock position to a release position in accordance with an embodiment of the present invention.
Figure 12:
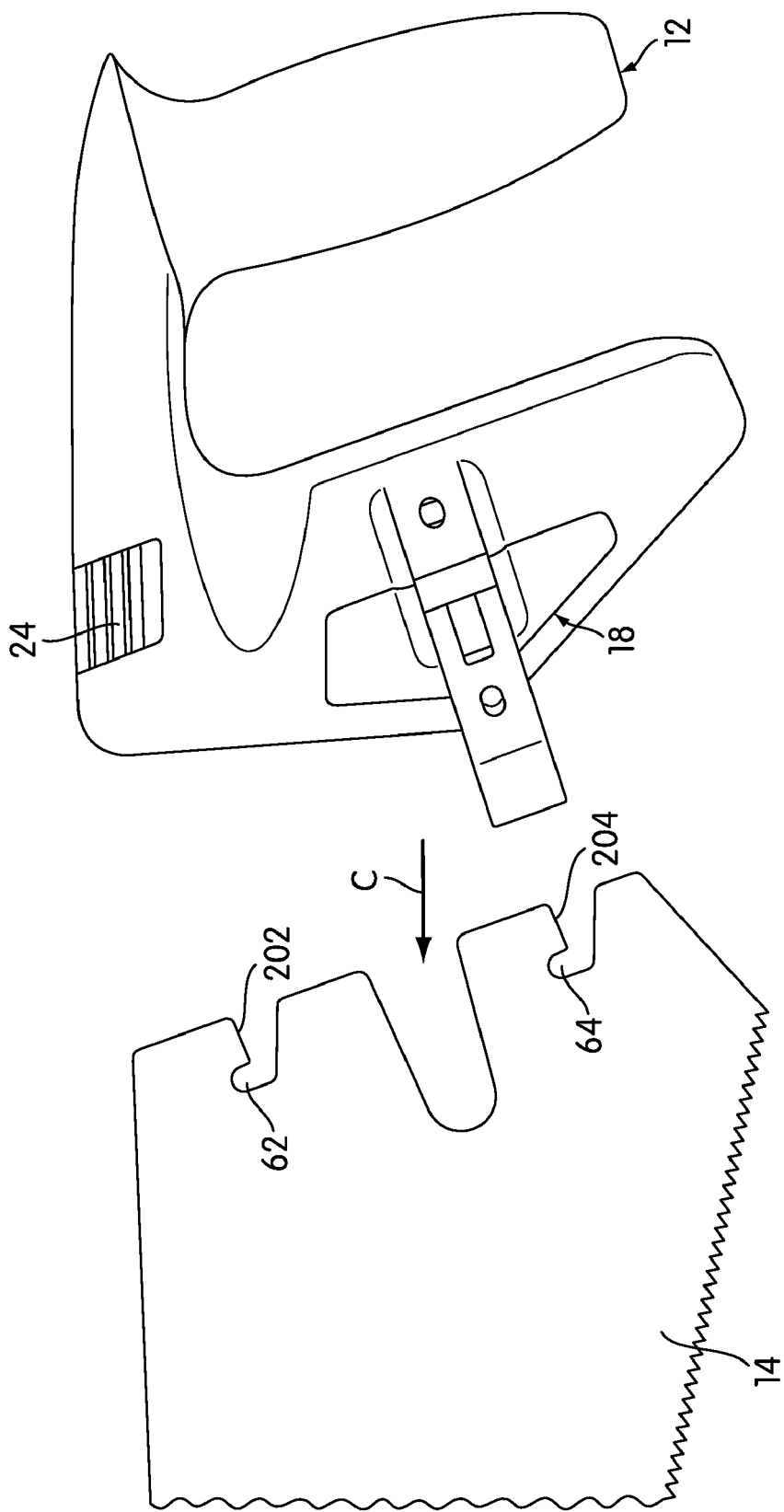
FIG. 12 is a partial side view of the handsaw, in which the blade is released from the handle in accordance with an embodiment of the present invention.

The operation of the lock assembly 16 and the clamp assembly 18 is discussed with reference to FIGS. 10-12. The clamp assembly 18 is moved from the clamp position (as shown in the FIGS. 9 and 13) to the release position (as shown in the FIGS. 10 and 14) in the direction of an arrow A. In one embodiment, the user uses the clamping member or lever attached to one end of the eccentric cam 52 to move the clamp assembly 18 in the direction of the arrow A from the clamp position to the release position. The movement of the clamp assembly 18 from the clamp position to the release position releases the clamping forces applied to the side surfaces 26 (as shown in FIG. 2) of the blade 14. Once the clamping forces applied to the side surfaces 26 of the blade 14 are released, the manually engageable actuator 24 is manually actuated (by being depressed) to move the lock structure 22 from the lock position (as shown in FIG. 9) to the release position. As shown in FIG. 11, when the manually engageable actuator 24 is actuated in a direction of an arrow B, the pins 72 and 74 on the lock structure 22 move downwardly within the recesses 62 and 64 and disengage from the recesses 62 and 64 on the blade 14. The spring 76 located on the second section 86 of the lock structure 22 is compressed as the locked structure 22 is moved from the lock position to the release position. In one embodiment, the manually engageable actuator 24 and the lock structure 22 are moved linearly from the lock position to the release position. Once the pins 72 and 74 on the lock structure 22 disengage from the recesses 62 and 64 on the blade 14, the blade 14 can be easily released from the handle 12 in the direction of an arrow C as shown in FIG. 12. Once the blade 14 is released from the handle 12, the spring 76 returns the lock structure 22 to the lock position.

In one embodiment, when the user desires to replace the blade 14 with a second blade or a different blade (e.g., with different tooth arrangement, different size, different blade type e.g., tenon (or backsaw), panel etc) (not shown), the user simply removes the blade 14 from the handle 12 as described above with respect to FIGS. 10-12, the user then aligns the second blade with respect to the handle 12 using the alignment mark 168 located on the second blade. The alignment mark 168 is constructed and arranged to provide an indication whether the handle 12 is accurately positioned on the blade. In one embodiment, when the handle 12 is correctly positioned on the second blade, the alignment mark 168 shows the user, by virtue of its alignment with an adjacent surface of forward portion 169 of the handle 12, that the handle 12 has been correctly oriented on the second blade. Once the second blade is aligned with respect to the handle 12, the second blade is pushed into the handle 12. As the second blade is pushed into the handle 12, surfaces of the second blade linearly move (e.g., downwardly) the lock structure 22 so that the pins 72 and 74 of the lock structure 22 engage with recesses on the second blade. The operation of connecting the blade to the handle is described in detail earlier with respect to FIGS. 6-9.

It should be appreciated that the lock assembly 16 described above are just one example of the types of arrangements that can be provided. While the present invention is described using two pins and two lock engaging regions, it is, however, contemplated that any number (e.g., even only one pin and lock engaging region) of lock engaging structures can be provided to receive the locking structures for locking the blade to the handle. Other arrangements, such as ratcheting arrangements or detent arrangements may also be provided. Other locking arrangements will be readily apparent to those skilled in the art, and the present invention contemplates a broad range of possibilities for such locking mechanism.

The operation of the clamp assembly 18 is discussed in detail with reference to FIGS. 13 and 14. As noted above, the stabilizing clamp assembly 18 is constructed and arranged to move between the clamp position (as shown in the FIGS. 9 and 13) and the release position (as shown in the FIGS. 10 and 14).

Figure 14:
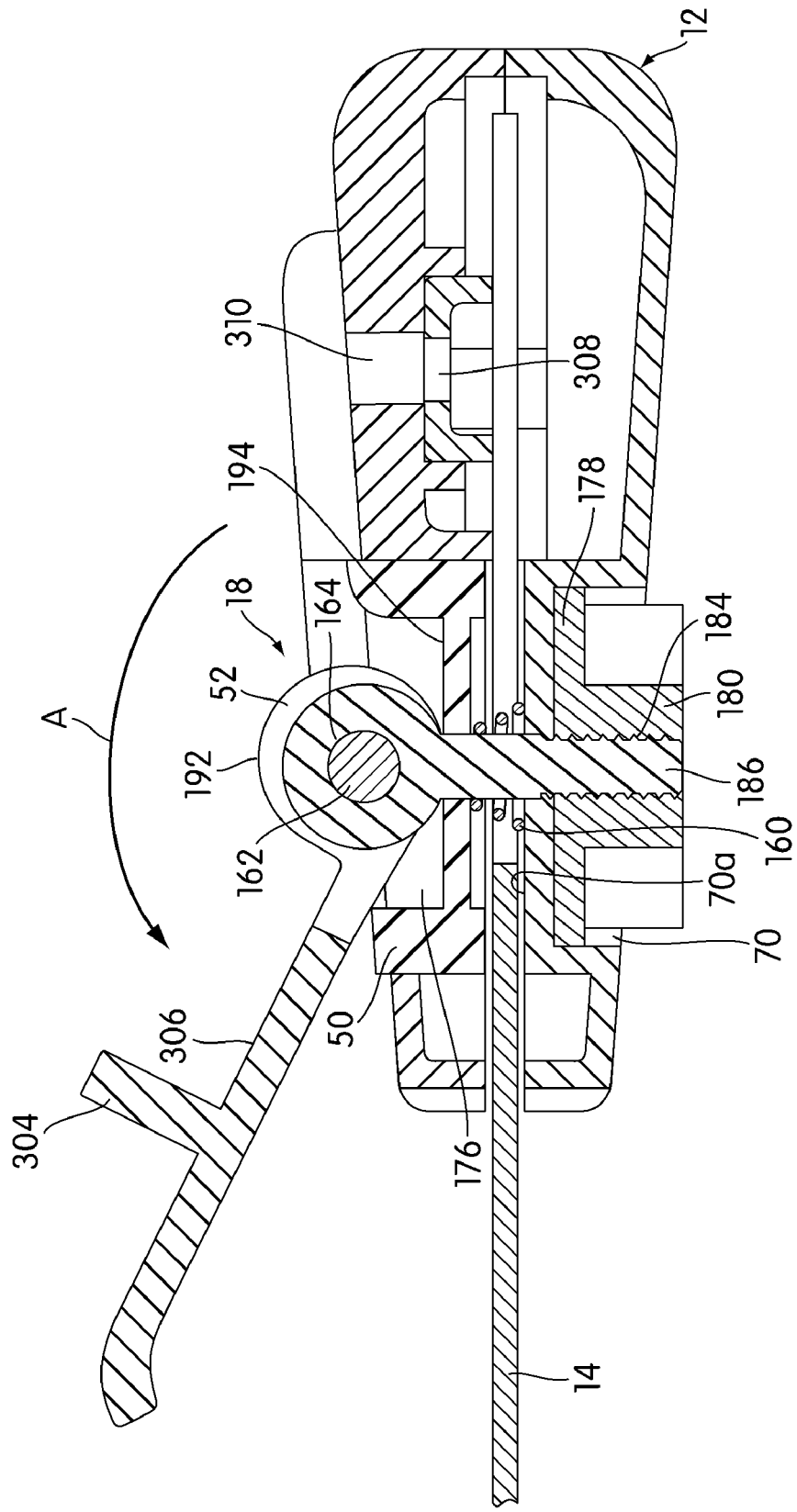
FIG. 14 is a cross-section view of the clamp assembly when placed in the release position in accordance with an embodiment of the present invention.

As the clamp assembly 18 is moved from the release position (as shown in FIG. 14) to the clamp position (as shown in FIG. 13), the eccentric cam 52 rotates about its pivot axis D-D (as shown in FIG. 2). In one embodiment, the cam 52 rotates eccentrically (e.g., off-centered) about its pivot axis D-D. When the cam 52 rotates about its pivot axis D-D, the camming surface 192 of the eccentric cam 52 contacts with the surface 194 of the blade engaging portion 50. The force exerted on the surface 194 moves the blade engaging portion 50 so that edges 190 of the blade engaging portion 50 bears against the blade 14 to apply the clamping force on one side surface 26 of the blade 14. An opposing clamping engagement is applied by an inner surface provided by or on the second handle portion 34 (e.g., surface 70*a* of the notch 70).

When the clamp assembly 18 is moved from the clamp position (as shown in FIG. 13) to the release position (as shown in FIG. 14), the camming surface 192 of the cam 52 is moved out of contact with the surface 194 of the portion 50, thus, releasing the force applied on the portion 50. With the force released from the portion 50, the edges 190 of the portion 50 are moved away from the side surface 26 of the blade, optionally assisted by the bias of the spring 160.

Figure 15:
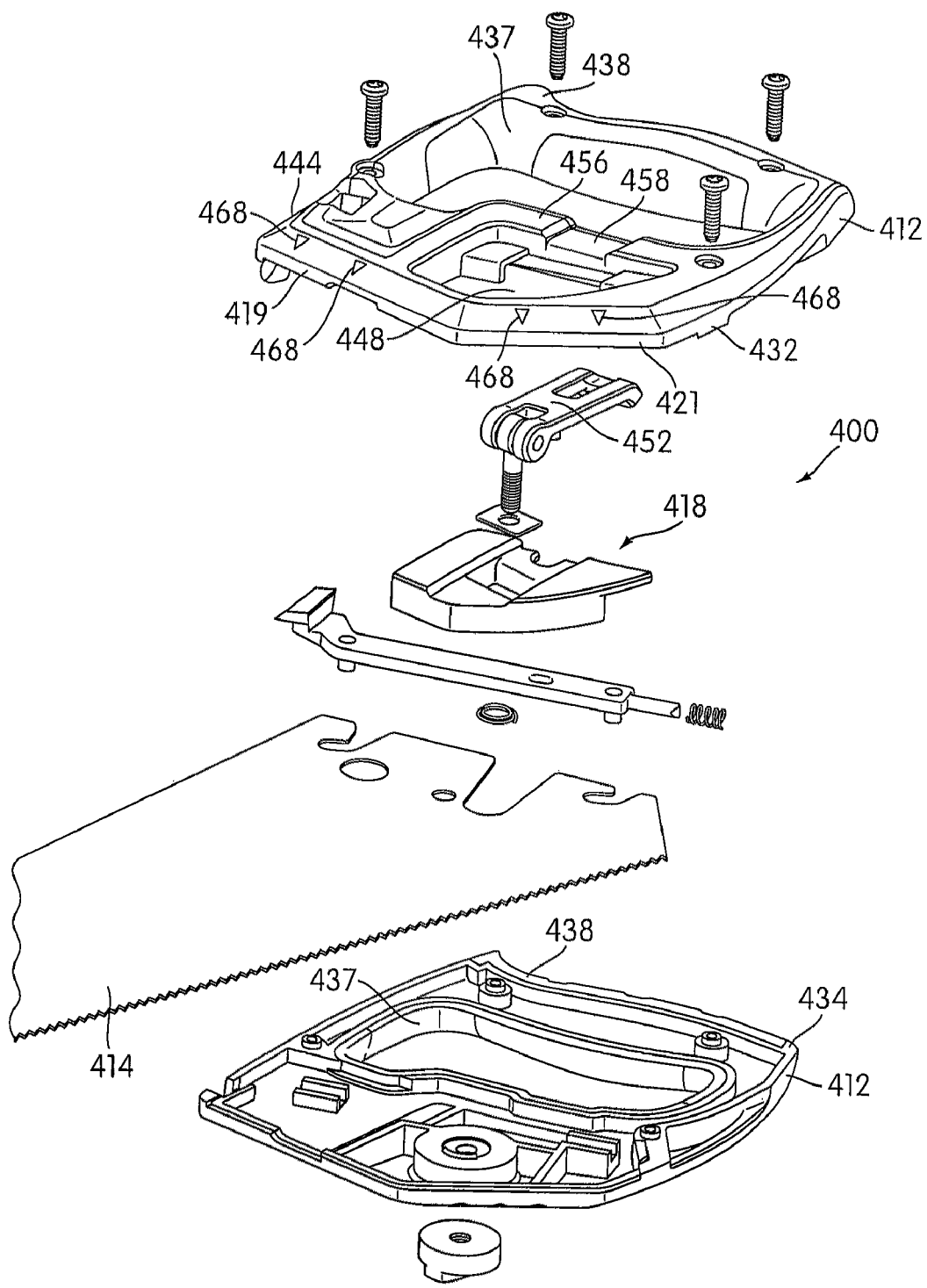
FIG. 15 is an exploded perspective view of the handsaw in accordance with another embodiment of the present invention.

FIG. 15 shows another embodiment of the present invention in which a handsaw 400 is shown. The operation of the handsaw 400 is the same as the operation of the handsaw 10 described in the earlier embodiment except for the following structural differences.

In one embodiment, an inner gripping member 437 of the handle 412 is contoured or arranged to more comfortably accommodate the fingers of the user and is made of a different material than an outer gripping member 438 of the handle 412 that is contoured or arranged to more comfortably accommodate the palm of the user.

In one embodiment, a first portion 432 of the handle 412 includes a recess 458 located on a side surface portion 456. The recess 458 is constructed and arranged to receive a portion (e.g., a manually engageable portion or lever) of an eccentric cam 452 therebetween, when a clamp assembly 418 is in the clamp position.

In one embodiment, surface portions 419 and 421 of the handle 412 form a 45 .degree. angle with respect to one another to enable a user to mark a 45 .degree. angle with a marker utensil. The surface portion 421 of the handle 412 and a top surface 444 of the handle 412 form a 90 .degree. angle and allow the user to mark a 90 .degree. angle.

Alignment marks 468 may be located on a first portion 432 of the handle 412. In such embodiment, the alignment marks 468 may be in the form of an indicator that is configured to provide an indication to the user only when the handle 412 is accurately positioned on a blade 414. In such embodiment, the blade 414 may include alignment marks that are constructed and arranged to align with the alignment marks 468 on the first portion 432 of the handle 412 and, thus, to enable accurate positioning of the handle 412 on a blade 414.

Figure 16:
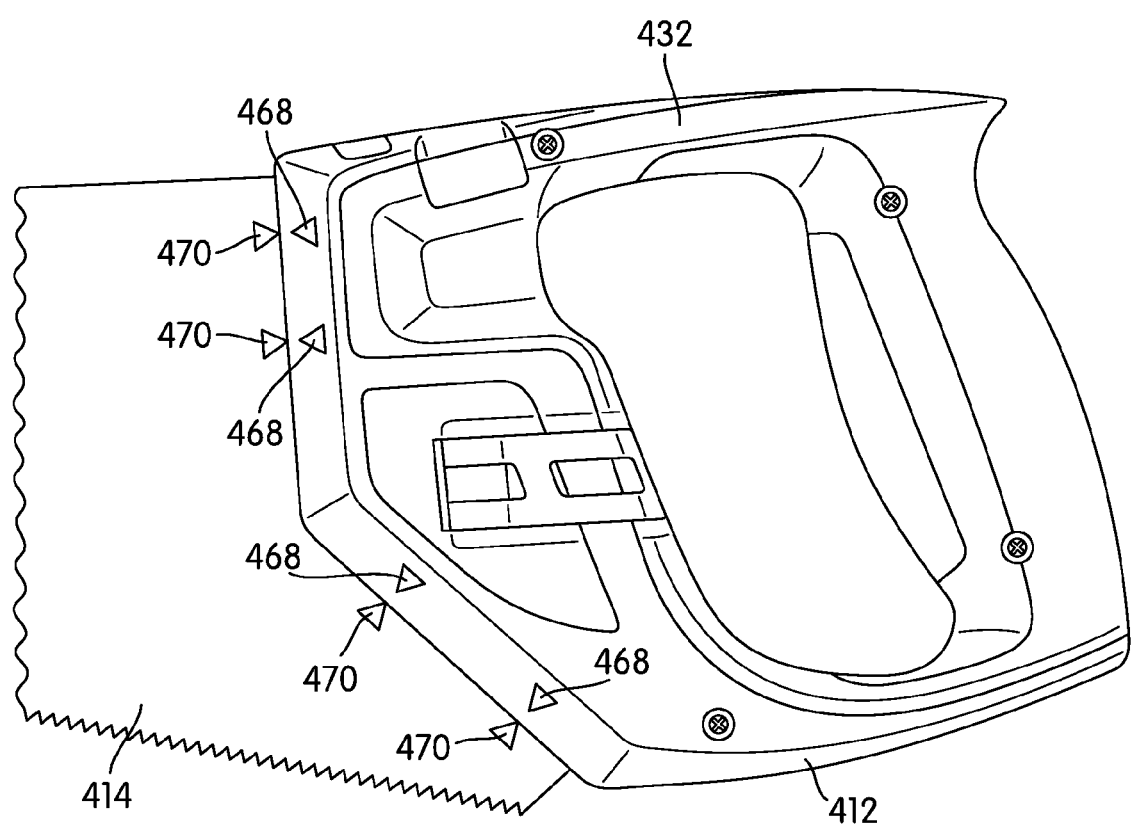
FIG. 16 is a partial side view of the handsaw, wherein the alignment marks on the handle are aligned with the aligned marks on the blade, when the handle is accurately positioned on the blade.

FIG. 16 shows the handsaw 400 in which the alignment marks 468 on the first portion 432 of the handle 412 are aligned with aligned marks 470 on the blade 414, when the handle 412 is accurately positioned on the blade 414.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A handsaw comprising:
   a handle, the handle comprising a lock assembly and having a slot and internal guide surfaces; and
   a blade releaseably mountable on the handle, the blade comprising a lock engaging region located toward one end thereof;
   wherein
   the lock assembly includes a spring biased lock structure and an actuator;
   the lock structure being movable between a lock position wherein it lockingly engages the lock engaging region of the blade to lock the blade to the handle, and a release position wherein the lock structure is released from engagement with the lock engaging region of the blade to enable the blade to be released from the handle; and
   the actuator being actuatable to move the lock structure from the lock position to the release position;
   wherein the guide surfaces guide the lock engaging region of the blade into locking engagement with the lock structure when the blade is moved linearly into the slot.

2. The handsaw of claim 1, wherein the lock structure being biased towards the lock position, and wherein generally linear movement of the blade into the slot and into engagement with the lock structure moves the lock structure against the spring bias until the lock structure locks with the lock engaging region of the blade.

3. A handsaw comprising:
   a handle, the handle comprising a hand grip, a slot, and a lock assembly; and
   a blade releaseably mountable on the handle, the blade comprising a lock engaging region located toward one end thereof;
   wherein
   the lock assembly includes a spring biased lock structure and an actuator;
   the lock structure being movable between a lock position wherein it lockingly engages the lock engaging region of the blade to lock the blade to the handle, and a release position wherein the lock structure is released from engagement with the lock engaging region of the blade to enable the blade to be released from the handle;

the lock structure being biased towards the lock position, and wherein generally linear movement of the blade into the slot and into engagement with the lock structure moves the lock structure against the spring bias until the lock structure locks with the lock engaging region of the blade; and the actuator being actuatable to move the lock structure from the lock position to the release position.

4. A handsaw comprising:
a handle, the handle comprising a hand grip, a slot and a lock assembly; and
a blade releaseably mountable on the handle, the blade comprising a lock engaging region located toward one end thereof;
wherein
the lock engaging region comprising at least one cam surface and a plurality of recesses;
the lock assembly includes a lock structure and an actuator, the lock structure comprising at least one lock element;
the lock structure being linearly movable between a lock position wherein it lockingly engages the lock engaging region to lock the blade to the handle, and a release position wherein the lock structure is released from engagement with the lock engaging region to enable the blade to be released from the handle;
the at least one cam surface and recesses being shaped and positioned to enable generally linear movement of the at least one lock element and the blade towards one another, so that the blade can be moved linearly into the slot such that the at least one lock element is forced into engagement with the at least one cam surface to cause the at least one lock element of the lock structure to move relative to the hand grip and enable the at least one lock element to be received in at least one of the recesses so as to lock the blade to the handle; and
the actuator being actuatable to move the lock structure from the lock position to the release position.

5. The handsaw of claim 4, wherein the lock structure comprises a spring, the spring is constructed and arranged to return the lock structure to the lock position.

6. The handsaw of claim 4, wherein the blade includes an alignment mark located on the blade, the alignment mark is constructed and arranged to provide an indication whether the handle is accurately positioned on the blade.

7. The handsaw of claim 4, wherein the at least one cam surface comprises a plurality of cam surfaces disposed in spaced relation to one another.

8. The handsaw of claim 7, wherein the at least one lock element comprises a plurality of lock elements.

9. The handsaw of claim 8, wherein the lock elements of the lock structure are configured to ride along the cam surfaces until the lock elements ride over the cam surfaces and into the recesses so as to lock the blade to the handle.

10. A handsaw comprising:
a handle, the handle comprising a hand grip, a slot, and a lock assembly; and
a blade releaseably mountable on the handle, the blade comprising a lock engaging region located toward one end thereof;
wherein
the lock engaging region comprising at least one cam surface and a plurality of recesses;
the lock assembly includes a lock structure and an actuator, the lock structure comprising at least one lock element;
the lock structure being movable between a lock position wherein it lockingly engages the lock engaging region of the blade to lock the blade to the handle, and a release position wherein the lock structure is released from engagement with the lock engaging region to enable the blade to be released from the handle;
the at least one cam surface and recesses being shaped and positioned to enable generally linear movement of the at least one lock element and the blade towards one another, so that the blade can be moved linearly into the slot such that the at least one lock element is forced into engagement with the at least one cam surface to cause the at least one lock element of the lock structure to move relative to the hand grip and enable the at least one lock element to be received in at least one of the recesses so as to lock the blade to the handle;
the actuator being actuatable to move the lock structure from the lock position to the release position; and
the blade includes an alignment mark located on the blade, the alignment mark is constructed and arranged to provide an indication whether the handle is accurately positioned on the blade.

11. The handsaw of claim 10, wherein the lock structure comprises a spring, the spring is constructed and arranged to return the lock structure to the lock position.

12. The handsaw of claim 10, wherein the at least one cam surface comprises a plurality of cam surfaces disposed in spaced relation to one another.

13. The handsaw of claim 12, wherein the at least one lock element comprises a plurality of lock elements.

14. The handsaw of claim 13, wherein the lock elements of the lock structure are configured to ride along the cam surfaces until the lock elements ride over the cam surfaces and into the recesses so as to lock the blade to the handle.

15. A handsaw comprising:
a handle, the handle comprising a hand grip, a slot, a lock assembly and a stabilizing clamp assembly; and
a blade releaseably mountable on the handle, the blade comprising a lock engaging region located toward one end thereof;
wherein
the lock engaging region comprising at least one cam surface and a plurality of recesses;
the lock assembly includes a lock structure and an actuator, the lock structure comprising at least one lock element;
the lock structure being movable between a lock position wherein it lockingly engages the lock engaging region of the blade to lock the blade to the handle, and a release position wherein the lock structure is released from engagement with the lock engaging region to enable the blade to be released from the handle;
the at least one cam surface and recesses being shaped and positioned to enable generally linear movement of the at least one lock element and the blade towards one another, so that the blade can be moved linearly into the slot such that the at least one lock element is forced into engagement with the at least one cam surface to cause the at least one lock element of the lock structure to move relative to the hand grip and enable the at least one lock element to be received in at least one of the recesses so as to lock the blade to the handle;

the actuator being actuatable to move the lock structure from the lock position to the release position; and the stabilizing clamp assembly constructed and arranged to move between a clamp position wherein the clamp assembly applies a clamping force to side surfaces of the blade and a release position wherein the clamp assembly releases the clamping force.

16. The handsaw of claim 15, wherein the lock structure comprises a spring, the spring is constructed and arranged to bias the lock structure toward the lock position.

17. The handsaw of claim 15, wherein the lock assembly is constructed and arranged to move linearly to disengage the at least one lock element from the corresponding recess to release the blade from the handle.

18. The handsaw of claim 15, wherein the handle comprises a first portion and a second portion joined to each other to define a slot therebetween, and wherein the slot is constructed and arranged to receive the blade therein.

19. The handsaw of claim 18, wherein the clamp assembly comprises an eccentric cam rotatable about a pivot axis.

20. The handsaw of claim 19, wherein the stabilizing clamp assembly further includes a connecting member connected to the eccentric cam, the connecting member is constructed and arranged to pass through an opening in the blade to engage with a securing member constructed and arranged to engage with the second portion.

21. The handsaw of claim 20, wherein the first portion includes a notch therein, the notch is constructed and arranged to receive a portion of the stabilizing clamp assembly, the clamp member and the connecting member therein.

22. The handsaw of claim 21, wherein the movement of the clamp assembly from the release position to the clamp position rotates the eccentric cam about the pivot axis such that the portion of the stabilizing clamp assembly bears against the side surfaces of the blade to apply clamping force to the blade.

23. The handsaw of claim 15, wherein the stabilizing clamp assembly further comprises a spring constructed and arranged to apply or enhance the clamping force to the side surfaces of the blade.

24. The handsaw of claim 15, wherein the blade includes an alignment mark located on the blade, the alignment mark is constructed and arranged to provide an indication whether the handle is accurately positioned on the blade.

25. The handsaw of claim 15, wherein the at least one cam surface comprises a plurality of cam surfaces disposed in spaced relation to one another.

26. The handsaw of claim 25, wherein the at least one lock element comprises a plurality of lock elements.

27. The handsaw of claim 26, wherein the lock elements of the lock structure are configured to ride along the cam surfaces until the lock elements ride over the cam surfaces and into the recesses so as to lock the blade to the handle.

* * * * *